(12) United States Patent
Fredlund et al.

(10) Patent No.: US 7,269,345 B2
(45) Date of Patent: Sep. 11, 2007

(54) CONTROLLING PHOTOFINISHING USING DATA FRAME DESIGNATED PHOTOFINISHING SUBCHANNELS

(75) Inventors: John R. Fredlund, Rochester, NY (US); Steven C. Sitter, Fairport, NY (US); William G. Peters, Fairport, NY (US); David C. Smart, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 261 days.

(21) Appl. No.: 11/021,131

(22) Filed: Dec. 22, 2004

(65) Prior Publication Data

US 2006/0133784 A1 Jun. 22, 2006

(51) Int. Cl.
G03B 17/24 (2006.01)
G03B 27/52 (2006.01)

(52) U.S. Cl. ......................... 396/311; 355/40

(58) Field of Classification Search ................ 396/311; 355/40, 41
See application file for complete search history.

(56) References Cited

U.S. PATENT DOCUMENTS

| | | | |
|---|---|---|---|
| 5,124,742 A | 6/1992 | Yoshikawa | 355/27 |
| 5,587,752 A * | 12/1996 | Petruchik | 396/315 |
| 5,767,947 A | 6/1998 | Schindler et al. | 355/40 |
| 5,889,578 A | 3/1999 | Jamzadeh | 355/41 |
| 6,263,167 B1 * | 7/2001 | Kamata et al. | 396/311 |
| 6,311,018 B1 | 10/2001 | Lawther | 396/60 |
| 6,429,924 B1 | 8/2002 | Milch | 355/40 |
| 6,456,798 B1 | 9/2002 | Keech et al. | 396/311 |
| 6,628,895 B2 * | 9/2003 | Fredlund et al. | 396/5 |
| 6,741,326 B2 | 5/2004 | Gindele et al. | 355/40 |
| 2001/0016118 A1 | 8/2001 | Saito et al. | 396/311 |
| 2003/0090572 A1 | 5/2003 | Belz et al. | 348/207.1 |

FOREIGN PATENT DOCUMENTS

| | | |
|---|---|---|
| EP | 1 213 909 | 6/2002 |
| JP | 63-285528 | 11/1988 |
| JP | 06-160986 | 6/1994 |

* cited by examiner

Primary Examiner—W. B. Perkey
Assistant Examiner—Rishi Suthar
(74) Attorney, Agent, or Firm—Robert Luke Walker

(57) ABSTRACT

In a photographic processing method, an image unit having a plurality of printable image frames is received. The image frames include a data frame having subchannel information. An indicator of the presence of the subchannel information is detected. A bitstream of all of the image frames is generated. Responsive to the indicator, the data frame is extracted from the bitstream and subchannel information is read from the data frame. Fulfillment of image frames of the bitstream is provided in accordance with the subchannel information. If no indicator is detected, then the image frames are fulfilled in accordance with a different, default subchannel.

31 Claims, 4 Drawing Sheets

CONTROLLING PHOTOFINISHING USING DATA FRAME DESIGNATED PHOTOFINISHING SUBCHANNELS

CROSS REFERENCE TO RELATED APPLICATIONS

Reference is made to commonly assigned, co-pending U.S. Publication No. 2006/0132852 Publication Date Jun. 22. 2006, entitled: CONTROLLING PHOTOFINISHING USING RANKED DATA FRAMES, in the names of Steven Sitter, John Fredlund; which is hereby incorporated by reference herein.

Reference is made to commonly assigned, co-pending U.S. Publication No. 2006/0132839 Publication Date Jun. 22, 2006, entitled: DATA FRAME HAVING DATABASE ACCESS INFORMATION, in the names of Steven Sitter, John Fredlund, David Hodder; which is hereby incorporated by reference herein.

FIELD OF THE INVENTION

The invention relates generally to the field of photofinishing, and in particular to customized or specialized photofinishing. More specifically, the invention relates to methods and systems controlling photofinishing using data frame designated subchannels.

BACKGROUND OF THE INVENTION

Photofinishing of photographic images can be provided by many different techniques depending upon the nature of the photographic film or other image unit used and the desired output. It is convenient to define techniques by what are sometimes referred to as "channels". For example, with film, each channel differs by the chemistry of the type of film that is photofinished in that channel. With film types such as Type 135 (35 mm), the channel is indicated by a DX code that is provided on the outside of the film cartridge. Subchannels can be provided within each channel. Subchannels differ in features of chemical processing, digital processing or both relative to a default feature set. Subchannels other than the default, are optional.

Photofinishing of digital images on memory units is comparable to the photofinishing of film, particularly when the images are input to a system for later delivery without further user interaction. For example, this applies to memory units input into a photofinishing minilab, without editing or other changes. The result is ordinarily the provision of output according to a default subchannel.

FIG. 2 illustrates a prior art system 200. An image unit 204 in the form of a film cartridge is input at an entry station 206. Channel information 202, such as a DX code, is detected on a photographic film image unit 204 using a detector 205. The channel information is sent to the controller or control unit 208. The filmstrip 210 of the film unit 204 is chemically processed in a development unit 212, in accordance with the channel information. The developed filmstrip 210 is scanned with a scanner 213 and a bitstream 214 of images is sent to the controller 208, which provides fulfillment instructions for the images, in accordance with a default subchannel 216. The illustrated output device 218 is a printer and the output 220 is a color print. The system 200 has a reader 222, which can be used with a digital image unit (not illustrated) to produce like results.

One approach to variable photofinishing is presented by the Advanced Photography System™, which provides for user selection of prints with different aspect ratios. This approach requires specialized cameras and other equipment and provides a limited and fixed variety of different outputs.

Another approach, disclosed in U.S. Patent Application Publication No. US 2003/0090572, to Belz et al., is use of a specialized digital file to transmit subchannel information. This approach also requires use equipment that can create the file.

A simple approach to accessing other subchannels, which has low cost and minimal impact on existing default subchannels, is desirable.

U.S. Pat. No. 6,311,018, to Lawther, proposes a method in which a DX code indicates that a particular roll of film is intended for both a particular channel and a particular subchannel that provides prints in multiple formats, such as pseudo panoramic and pseudo zoom. A camera with the multiple format capability places a second code within the image area of individual image frames to indicate which pseudo format print is desired for an individual frame. The photofinisher reads the DX code indicating the film channel and subchannel and then reads the codes for each frame. The code selecting the particular format must be present in the image area of the particular frame, or that image will be printed as a standard full-frame image. A shortcoming of this approach is that the DX is limited to the particular subchannel and a special camera is required to apply the codes in the image frames.

U.S. Pat. No. 5,587,752, to Petruchik, discloses a film cartridge that uses a data frame positioned near the trailer end of the filmstrip to designate a set of prerecorded images for compositing. This method uses a special camera to place marks on the film. These marks make selections from the prerecorded image set identified by the data frame. This method requires a specialized camera, but the data frame can be scanned by digital photofinishing equipment using the same scanner that is used for scanning other film frames.

U.S. Pat. No. 6,429,924, to Milch, is similar to Petruchik, but has a data frame in the form of an image of a pattern at each end of the filmstrip. The pattern, when scanned during photofinishing, indicates that metadata for individual frames is present within the portion of the filmstrip bearing the sequence of images.

U.S. Pat. No. 6,628,895, to Fredlund et al., discloses a method for capturing a single data frame on a film unit within a camera by photographing a card bearing information for the data frame.

In photofinishing using data frames, every image unit could be checked for the presence of a data frame. This would consume a large amount of processing time and would be wasteful for image units that lacked a data frame.

It would thus be desirable to provide improved methods and systems, in which the presence of a data frame on an image unit is ascertained simply and efficiently.

SUMMARY OF THE INVENTION

The invention is defined by the claims. The invention, in broader aspects, provides a photographic processing method, in which an image unit having a plurality of printable image frames is received. The image frames include a data frame having subchannel information. An indicator of the presence of the subchannel information is detected. A bitstream of all of the image frames is generated. Responsive to the indicator, the data frame is extracted from the bitstream and subchannel information is read from the data frame. Fulfillment of image frames of the bitstream is provided in accordance with the subchannel information. If no indicator is detected, then the image frames are fulfilled in accordance with a different, default subchannel.

It is an advantageous effect of the invention that an improved methods and systems are provided, in which the presence of a data frame on an image unit is ascertained simply and efficiently.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
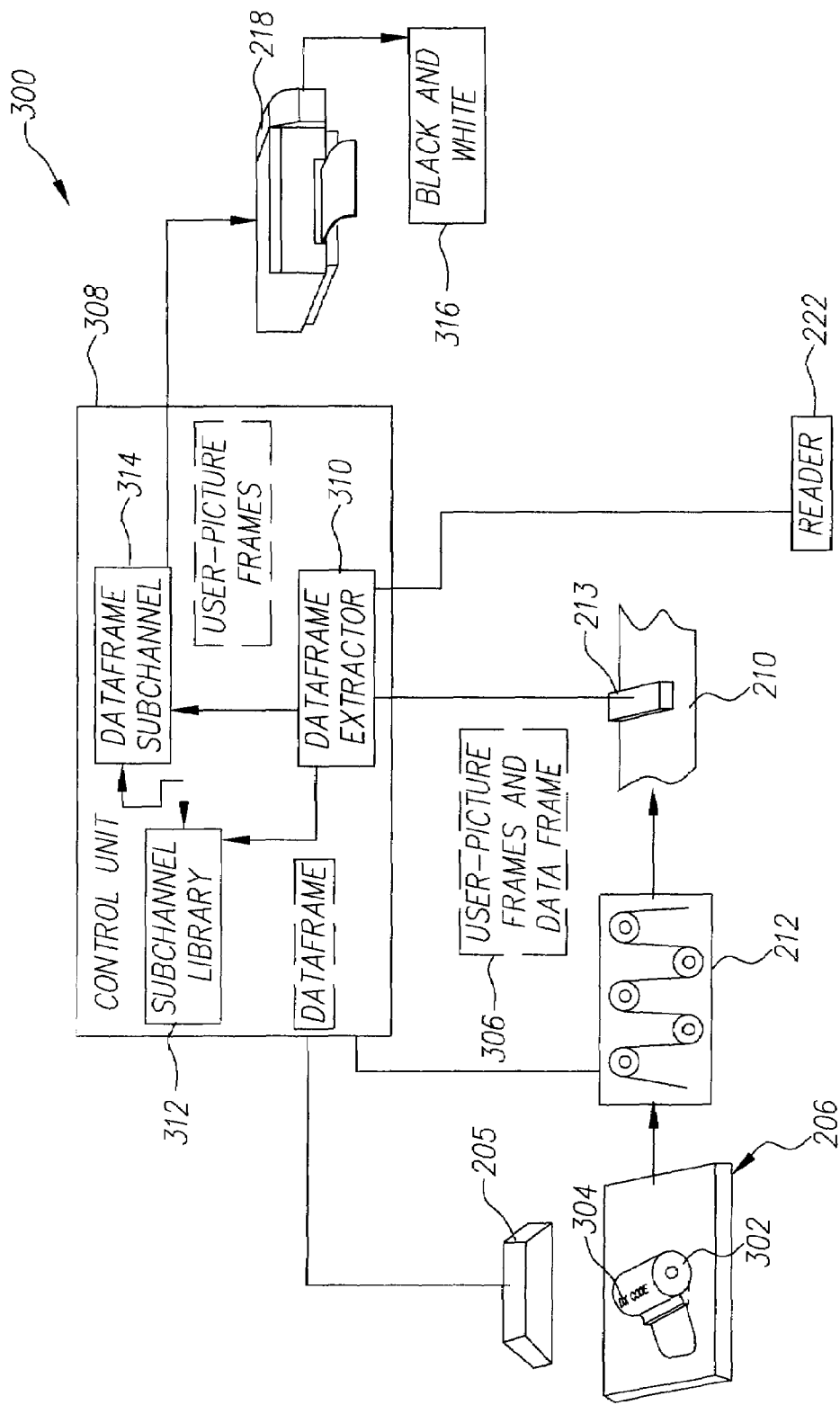
FIG. 1 is a diagrammatical view of an embodiment of the system processing an image unit.
Figure 2:
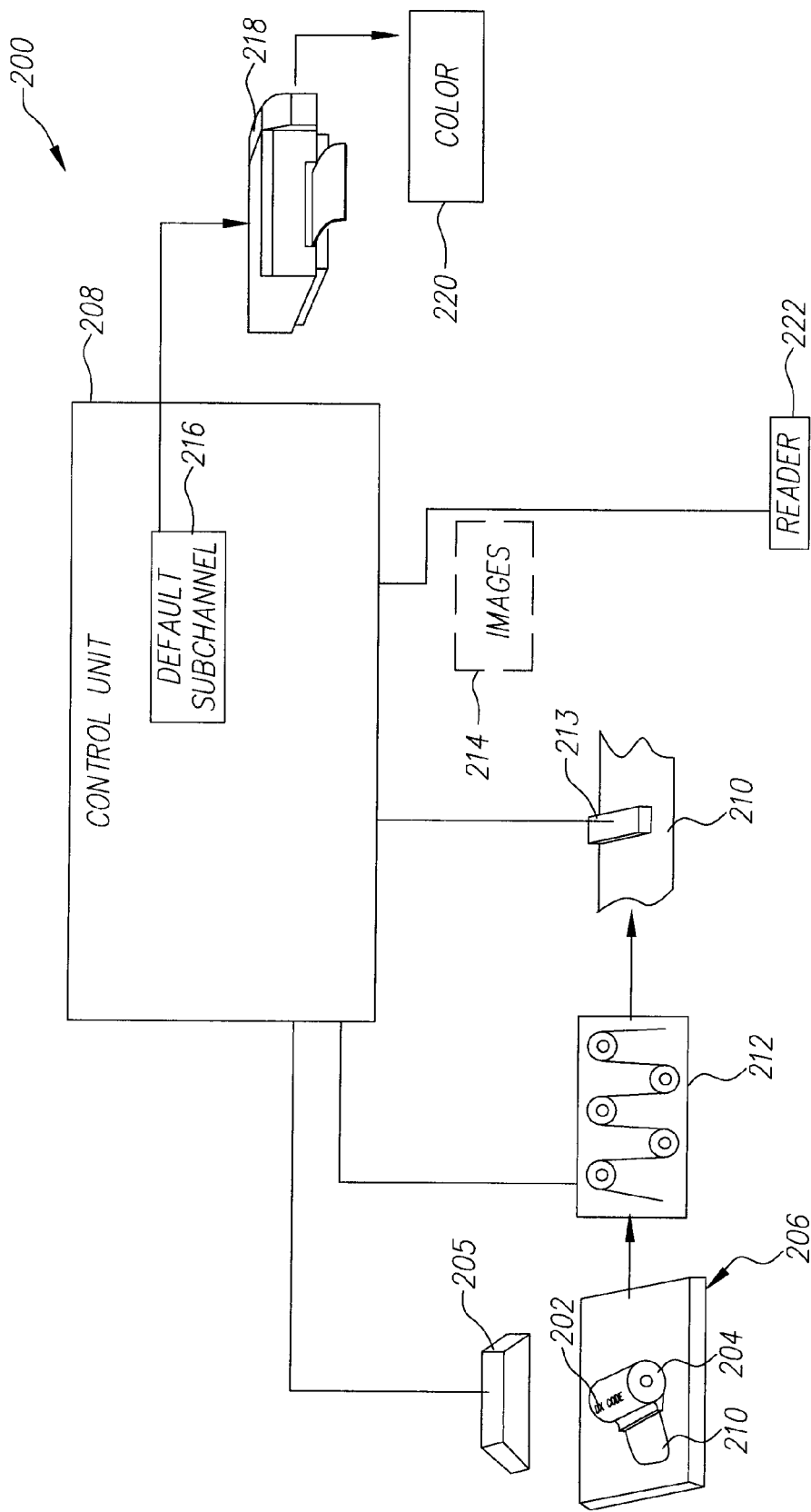
FIG. 2 is a diagrammatical view of a prior art system processing the same image unit as in FIG. 1.
Figure 3:
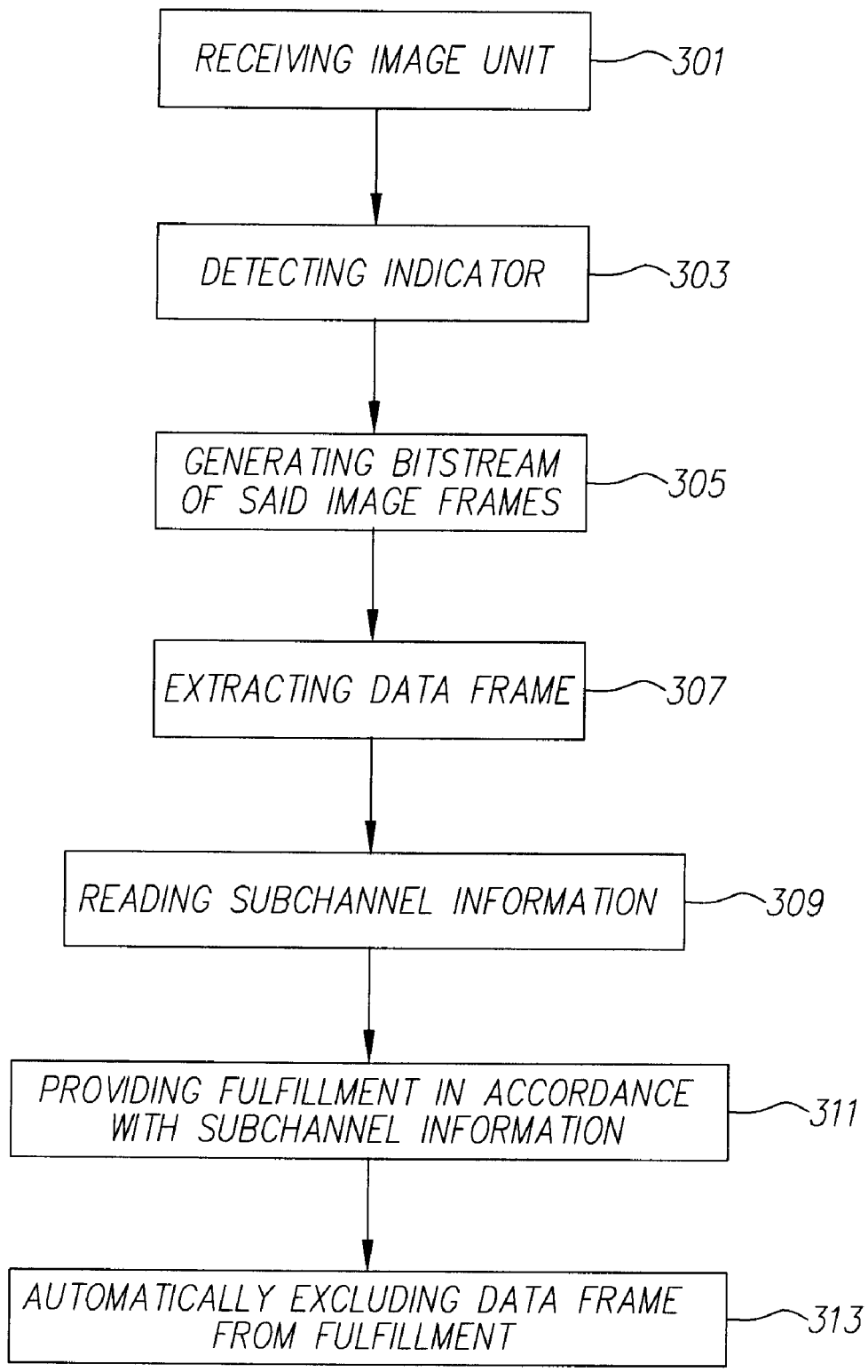
FIG. 3 is a flow chart of an embodiment of the method.
Figure 4:
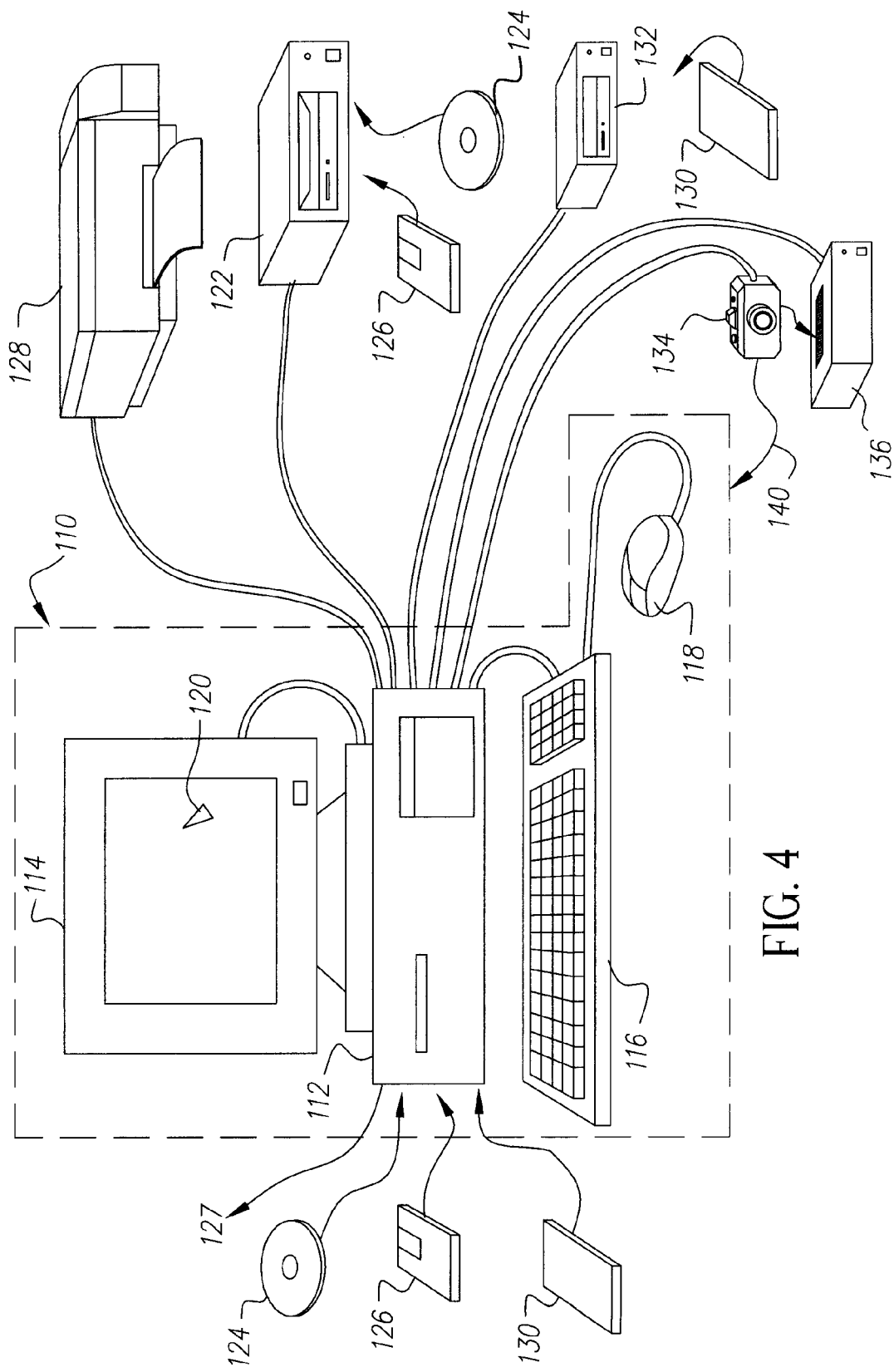
FIG. 4 is a diagrammatical view of another embodiment of the system.

Referring to FIGS. 1 and 3, in the method and system 300, an image unit 302 is received (301) at an entry station 206. The image unit 302 has printable image frames including a data frame and one or more non-data frames. The data frame includes subchannel information in the form of readable indicia. An indicator 304 of the presence of the subchannel information is associated with the image unit 302. The indicator 304 is detected (303). A bitstream 306 of the image frames is formed (305) and sent to a controller or control unit 308. Responsive to the indicator 304, the data frame is extracted (307) from the bitstream 306 by a data frame extractor 310, leaving the non-data frames. The subchannel information in the data frame is read (309), a subchannel library 312 is accessed, and the indicated subchannel (such as conversion to black-and-white) is applied to the image frames other than the data frame to provide (311) a data frame subchannel 314, in accordance with the subchannel information. The data frame subchannel is sent as instructions to an output device 218 (illustrated as a printer) and the output 220, such as a black-and-white print 316, is provided. Printing or other fulfillment of the data frame is, preferably, suppressed (313) automatically. The same system provides fulfillment of image frames in image units lacking the indicator or having an unreadable indicator, in accordance with a default subchannel, as in FIG. 2.

The method and system relate to light images of scenes that have been captured in an image unit as image frames. The term "image unit" is used herein to refer to both film units and memory units. The film unit has a piece of film, such as a filmstrip, and, for some types of film unit, has a holder for the filmstrip. A memory unit includes computer readable digital storage media that provides digital memory for an electronic camera or other capture device. The form of the memory is not critical. For example, the memory can be optical, such as an optical CD or DVD, electronic such as a digital memory card; or magnetic such as magnetic tape. The following discussion is generally directed to an embodiment using a Type 135 photographic film cartridge, but like considerations apply to other embodiments.

The image unit has a plurality of frames. The term "frame" is used herein to refer to space within the image unit, which stores or is capable of storing a captured image. The term "image frame" is used herein to refer to a frame that stores an image as image information. The image information is analog, in the case of photographic film, and can be in the form of a latent image (before chemical processing) or a visible image (following chemical processing). The image information is digital, in the case of a memory unit.

The image unit is generally discussed herein in terms of the same media being used for both capture and storage of archival image information. It should be understood that stored images may, in some cases, be transferred to a replacement medium, with comparable characteristics, one or more times. For example, an image unit can start out with the features of a one-time use photographic film camera. After film exposure, the camera body is removed; the filmstrip is removed from its canister and developed, and the film is scanned and the resulting digital images are stored in memory and digitally processed. Image frames captured with a digital camera are transferred from one type of digital memory to another, during photofinishing. The image frames of an image unit remain associated with each other at least through photofinishing.

The stored image frames are generally treated herein as being realistic images of the subject photographed and having the same, unchanging information content as the original light image. It will be understood that this is a simplification provided as a matter of convenience for explanatory purposes and that captured and stored image frames will differ from initially captured images in a manner well known to those of skill in the art. For example, the image frames must differ from the original light image, since the captured and stored image frames are subject to the limitations of the imaging system and the media. Film image frames are subject to limitations such as grain size. Digital image frames are necessarily pixellated and commonly have color values partially extrapolated from neighboring pixels. Both types of image frames may also be subject to enhancement or other modification between capture and output, for example, to extrapolate values for pixels degraded by sensor defects. Image frames on film are subject to the chemical and physical effects of processing. Image frames are generally stored in a non-realistic form, such as a film negative or a particular type of digital image file that requires modification to render the images viewable. Digital image frames must be displayed or printed and may require other modification, such as decryption or modification for a particular display device.

The image frames include "data frames" and "non-data frames". The data frames are images of specific indicia that are readable by an expected photofinishing system. Other image frames are non-data frames. Generally, non-data frames are user-picture frames (as shown in FIG. 1), which are images captured by a user of a camera for the purpose of obtaining a printed final image or a final image in some other form. The user is generally, but not always the end user. Other types of non-data frames are possible. For example, some high-end cameras optically write one or more image frames with image capture information, prior to film removal.

The term "photofinish" is used herein to refer to one or more physical, chemical, optical, and digital techniques used to produce a visible output, referred to here as a "final image", which is a printed or displayed image or a digital image that is printable or displayable. Photofinishing thus includes such techniques as chemical development and digital image modification and printing. Photofinishing can be provided repeatedly for an image unit, but the repetitions may or may not repeat the same techniques. For example, an initial photofinishing of a photographic film type image unit will include chemical development. Later photofinishing of the same image unit will not. A "photofinishing system" is a device or group of locally or remotely linked devices providing a photofinishing function.

A data frame is an image frame and, thus, is printable as a hard copy image and displayable as a display image in the same manner as non-data frames. The data frame can be a photograph of a light image or, with a digital image unit, can be digitally generated. The data frame occupies space in the image unit that could otherwise be occupied by a non-data frame. The data frame is stored in the image unit and extracted from the image unit in the same manner as the non-data frames.

With film, the requirement that a data frame is or can be extracted from the image unit in the same manner as other images, localizes the data frame upon a filmstrip into the same area of the filmstrip as the images. For example, the data frame cannot be located outside or between perforations of the filmstrip. The data frame can be located on a leader or trailer, but only if that portion of the film strip can be reduced to final output, during photofinishing in the same manner as other images. With many types of film cameras each captured image is the same size, that is, all "storing" is a standard and uniform size within narrow limits. In such film camera types, a data frame is preferably the same size as an image frame. This can be varied. For example, some cameras can capture, both full and half frame images. In this case, a data frame can be either size.

In a digital image unit, a data frame is provided as a printable/displayable digital image file. The data frame in digital memory has the same size constraints as other image files. The data frame is not limited to a particular resolution, but typically the data frame is the same size as one or more of the other image files in an image unit. Storage space in the image unit can be saved, if a data frame is stored at the minimum resolution necessary for reading the data frame, within the limits of image capture of a particular camera or other capture device. In that case, non-data frames will likely be captured and stored at a higher resolution than the data frame. A header of an image file that contains image related information, but is not itself an image; is also not a data frame. It is preferred that a digital data frame be capable of undergoing digital processing in the same manner as associated images. For example, if image frames in a digital image unit are expected to be subject to lossy compression/decompression, then the data frame is configured so as to be capable of surviving the same lossy compression/decompression without unacceptable degradation in the same manner as non-data frames.

A data frame differs from the Digital Print Order File described in U.S. Patent Application Publication No. US 2003/0090572, in that a data frame is stored and printable as an image, and takes the place of a non-data frame. A Digital Print Order File or the like is not stored or printable as an image in the same manner as other image frames.

The data frame can be captured in the same manner as other image frames. In other words, photosensitive media, such as an electronic imager or photographic film, is exposed to a light image of the data frame. The light image can be provided by a transmission or reflection print or a display of the data frame content. With digital image units, the data frame can be digitally created or can be captured as described for photographic film. The digital camera can capture a light image of the data frame, which is then stored in the digital image unit.

Capture of the data frame can be before, during, or after capture of non-data frames. (Capture of the data frame after capture of non-data frames, is not preferred if there is a risk that the image unit will lack adequate storage space.) The data frame can be captured by anyone in possession of the image unit at a particular time. For example, the manufacturer can capture the data frame during manufacturing, a distributor or dealer can capture a data frame prior to transfer of the image unit to an end user. The end user can also capture the data frame. The data frame can also be captured as an initial part of the photofinishing process.

The data frame content can be presented to a user or the like in a form that allows capture of the content and creation of the corresponding data frame. The size of data frame content is a function of the environment in which the data frame content is presented and the features of the camera or other capture device used to capture the data frame. (For convenience, image capture in the following is discussed in relation to cameras.) For example, data frame content can be presented on small media, such as a card, held close to a camera or on large media farther away, such as a poster or billboard that is photographed at a distance. To make capture easier, fiducials or other features can be provided, which allow the photographer to more easily align the data frame content in the viewfinder of the camera. It may be necessary to provide other features, such as adequate lighting for image capture in a dark environment.

Depending upon how a picture is taken, the data frame content can occupy all or only part of the data frame. It is preferred that the data frame content occupy most or, more preferably, all of the data frame. This prevents user-pictures that include a data frame as incidental content from being treated as data frames. The size and nature of the data frame content can be varied to meet particular size requirements in the data frame and other limitations, such as limits on close focusing by particular cameras. For example, convenient data frame content for capture by a simple point-and-shoot camera is sized to provide a light image at three to six feet that fills the viewfinder (and the image frame). An example of a fixture for the capture of data frames using a one-time-use camera is disclosed in U.S. Pat. No. 6,628,895, which is hereby incorporated herein by reference.

The data frame is an image frame that has indicia that are readable to provide particular fulfillment information. The data frame is recorded in a frame of the image unit, in the same manner as other images are or can be recorded. The fulfillment information defines a photofinishing subchannel to be used in processing the non-data frames in the same image unit.

The term "photofinishing channel", as used herein, refers to a predetermined analog and digital or digital photofinishing procedures for producing a final image that is output to a user. The method and system are generally discussed herein in relation to an embodiment in which images are captured on film and chemically processed prior to scanning and digital processing. With photographic film, a photofinishing channel includes chemical development and application of one or more digital processing algorithms to a digitized version of the captured image. A digital capture channel is similar, but eliminates the chemical development procedures and scanning or other conversion from optical to electronic image. In the sense used herein, a photofinishing channel includes image manipulation performed within a digital camera.

A "subchannel" is a variable procedure of a particular channel. The subchannels discussed herein all relate to variable digital image processing procedures. The photofinishing channel includes a default subchannel, which provides an output image using a default procedure.

The photofinishing channel of the system 300 has a default processing path, which provides for output products such as a displayed and stored digital image. One or more alternative subchannels are available that provide a digitally altered image, such as the black and white image indicated in FIG. 1. The default path and subchannels are predetermined relative to digital photofinishing of a particular image unit, at least to the extent necessary to assure that use of predefined data frame results in use of a predictable photofinishing subchannel.

The indicia of the data frame can be in any form that is readable by the photofinishing unit. For example, the indicia can be optically readable alphanumeric text and/or an encodement such as a two- or three-dimensional barcode. Examples of useful barcodes for this purpose and associated methods are disclosed in U.S. Pat. No. 6,456,798, to Keech et al., which is hereby incorporated herein by reference. The data frame can include one item of fulfillment information or multiple items. The indicia can repeat fulfillment information in the same or different forms, such as a barcode and optically readable text. In addition to indicia of fulfillment information, the data frame can include other functional or decorative features, for example, a decorative image can be provided. The data frame may be constructed such that the data is hidden or obscured by imagery. One or more layers of encryption can be used and indicia of fulfillment information can be hidden within an image on the data frame, so as to not be visible to casual examination. Appropriate methods and apparatus for preparation and use of all of these forms of metadata are well-known to those of skill in the art.

Alternatively, the data frame may be an image with a particular signature that calls out the desired subchannel. For example, if the desired subchannel photofinishing is the creation of a booklet containing user captured images in surrounds that are appropriate for an event, the data frame can be a logo for the event. The photofinishing system reads the logo containing data frame and acts on the image frames appropriately. In addition to indicating the appropriate subchannel, the data frame can be printed and used as a cover for the booklet.

Multiple layers of encryption can be used. Encodement information can be hidden within the data frame steganographically, so as to not be visible to casual examination. Appropriate methods and apparatus for preparation and use of all of these forms of encodements are well-known to those of skill in the art. The indicia can be repeated multiple times, in the same form or different forms. In addition to the indicia, the data frame can include other functional or decorative features, for example, a decorative image can be provided, which may or may not relate to the subchannel indicated by the data frame.

The indicator 304 on the image unit provides a notification of the presence of the data frame in the image unit. Responsive to the detection of the indicator, the data frame is extracted from the bitstream. After the data frame is extracted, the subchannel information is read. The image frames of the bitstream are then processed in accordance with the subchannel information. If no indicator is detected, then a default subchannel is used.

The indicator is independent of the data frame, that is, the indicator can be read, without reading the data frame or extracting the data frame from the image unit. It is preferred that the indicator is readable external to the image unit. The indicator can be provided in any convenient form and can be detected at any time prior to fulfillment. In the embodiment of FIG. 1, the detecting of the indicator is prior to the generating of the bitstream. The indicator 304 is part of a DX code on a film unit and the indicator is detected by reading the DX code on the outside of the film cartridge. The DX code can, alternatively, be read on the developed film during scanning or in an additional step.

The indicator can be detectable optically or by other means. For example, the indicator can be provided as part of an encodement within a radiofrequency identification transponder that is attached to or otherwise associated with the image unit. In this case, the reading station is configured to hold the image unit within range of a transceiver for the transponder.

The data frames are extracted from the bitstream using an algorithm that recognizes required features of the data frame. Extraction of the access information can be based upon optical character recognition or barcode recognition or the like. Suitable techniques for this purpose are well known to those of skill in the art. Provisions can be made to help limit application of such techniques to only the data frame. For example, a data frame can be required to have particular values in one or more predefined windows of the image frame. A shape recognition algorithm can be used for detection of one or more features present in the data frames. The features can be chosen so as to render misidentification unlikely. A example of a suitable algorithm for particular features is disclosed in U.S. Pat. No. 6,741,326, which is hereby disclosed herein by reference.

The controller 308 sends the image frames to a printer or other output device 218, which provides final images of all or the image frames as output. The printer outputs printed images of all of the image frames. The term "final images" is used herein to refer collectively to printed images, displayed images, and displayable and printable images recorded in digital media, such as a CD-ROM or DVD, that is transferred to the user who submitted the image unit.

The photofinishing system can provide subchannels in an almost unlimited variety. Fulfillment options provided by these subchannels can generally be roughly divided into three categories: remedial efforts, image alterations, and provision of additional goods and/or services. Remedial efforts are directed towards retaining the original information content, but improving the perceived quality of an image. Image alterations deliberately modify some of the original information content of an image. Table 1 lists some examples of fulfillment options.

TABLE 1

Optical distortion correction
Lateral color optical defect correction
Edge sharpening
Contrast correction
Color saturation correction
Improve grain, contrast, and color in underexposed pictures
Latitude improvement
Visible grain/noise reduction
Improve color accuracy/gamut remapping
Zooming and cropping
Intentional distortion
Solid color fill
Soft focus effects
Contrast exaggeration or reduction
Monochrome (black-and-white, sepia)
Redeye removal
Texture effects TABLE 1-continued Print only outlines
Add predetermined titles or logos to front or back
Solarization effects
Special borders or other photomontage
Add Copyright message
Sticker prints
Poster prints
Double prints
Selected paper surface finish
Selected digital medium
Stock photo or promotional item with order
Changes in delivery, billing, or follow on services Fulfillment options can be implemented in any manner appropriate for the particular product and/or service provided. For example, a particular fulfillment option can be provision of automatic compensation for the bluish cast seen in underwater photographs. This type of finishing is marketed by the Eastman Kodak Company of Rochester, N.Y. as Sea Processing™. Sea Processing of an image unit applies algorithms that improve the appearance of pictures captured underwater, while leaving pictures taken above water unchanged. In this case, the algorithm is automatically applied as needed, following reading of the subchannel information. As another example, the subchannel can be provision of a poster of a stock photo. In this case, the implementation of the subchannel can include communication of information to an operator, who then provides a required function.

The digital photofinishing system 300 is illustrated, in FIG. 3, by a personal computer system 110. Although the computer system 110 is shown for the purpose of illustrating a preferred embodiment, the present invention is not limited to the computer system 110 shown, but may be used on any electronic processing system such as found in digital cameras, home computers, kiosks, dock printers and other devices interacting with digital cameras and memory devices, retail or wholesale photofinishing, or any other system for the processing of digital images. The computer system 110 includes a microprocessor-based unit 112 (also referred to herein as a digital image processor) for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122, which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association), which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to transformations. The output device can be a printer or other output device that provides a paper or other hard copy final image. The output device can also be a display output device that provides the final image as a softcopy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 3 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

The general control computer shown in FIG. 3 can store implementing programs in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation may also be stored on any other physical device or medium employed to store a computer program indicated by offline memory device.

It should also be noted that the present invention can be implemented in a combination of software and/or hardware and is not limited to devices, which are physically connected and/or located within the same physical location. One or more of the devices illustrated in FIG. 3 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

This methods and systems herein allow many different subchannels to be provided for specialty photofinishing, while using only a single DX code or other indicator. For example, subchannels can be provided for Sea Processing™, double prints, black-and-white prints from color film, a bundled CD of the images with the order, and sepia tone prints.

The methods and systems herein save computational time. If the indicator, such as a specialty photofinishing DX code, is not detected, the photofinishing system does not search for the data frame specifying the particular specialty photofinishing, and the order is processed in the standard fashion using the default subchannel. When the indicator is present, the photofinishing system is alerted to the need to search out the pre-exposed data frame and determine which specialty photofinishing is to be applied.

The methods and systems herein provide an additional authentication value. If the indicator, such as a specialty photofinishing DX code, is not detected, the photofinishing system does not search for the data frame specifying the particular specialty photofinishing, and the order is processed in the standard fashion using the default subchannel. When the indicator is present, the photofinishing system is alerted to the need to search out the pre-exposed data frame and determine which specialty photofinishing is to be applied. Because the presence of the indicator is necessary for detection and processing according to the subchannel, image units sold without the indicator will have no ability to be processed according to any subchannel other than the default. Thus if a data frame is captured by the memory unit without the indicator for the purpose of obtaining the value of the subchannel without paying for it, the image frames will not receive the benefit of the processing called out by the data frame.

The invention has been described in detail with particular reference to certain preferred embodiments thereof, but it will be understood that variations and modifications can be effected within the spirit and scope of the invention.

What is claimed is:

1. A photographic processing method comprising the steps of:
   receiving an image unit having a plurality of printable image frames, said image frames including a data frame having subchannel information;
   detecting an indicator independent of the data frame, the indicator indicating the presence of said subchannel information in said image unit, said indicator being associated with said image unit;
   generating a bitstream of said image frames;
   responsive to said indicator, extracting said data frame from said bitstream;

reading said subchannel information from said data frame;

providing fulfillment of said image frames of said bitstream in accordance with said subchannel information.

2. The method of claim 1 further comprising automatically excluding said data frame from said fulfillment.

3. The method of claim 1 wherein said detecting is prior to said generating.

4. The method of claim 1 wherein said detecting further comprises reading an encodement associated with said image unit, said encodement designating a processing channel; and wherein said generating is in accordance with said processing channel.

5. The method of claim 4 wherein at least some of said image units have latent images recorded on photographic film and said generating further comprises chemically developing said latent images to provide visible images and scanning said visible images.

6. The method of claim 1 wherein said extracting further comprises displaying said data frame.

7. The method of claim 1 wherein said extracting further comprises printing said data frame.

8. The method of claim 1 further comprising capturing said data frame prior to said generating.

9. The method of claim 1 wherein said image unit has media and a casing holding said media, and said media is readable external to said casing.

10. The method of claim 9 wherein said media is digital memory.

11. The method of claim 9 wherein said media is photographic film.

12. The method of claim 1 wherein said data frame has the same aspect ratio as one or more other said image frames.

13. The method of claim 1 wherein said data frame has a resolution differing from one or more other said image frames.

14. The method of claim 1 wherein said data frame is an image.

15. The method of claim 1 wherein said data frame is an image containing a human readable logo.

16. A photographic processing method comprising the steps of:
receiving an image unit having a plurality of printable image frames, said image frames including a plurality of user-picture frames and a data frame having subchannel information;
attempting to detect an indicator independent of the data frame, the indicator indicating the presence of said subchannel information in said image unit, said indicator being associated with said image unit;
generating a bitstream of said image frames;
when said indicator is detected:
  (a) automatically extracting said data frame from said bitstream;
  (b) reading said subchannel information from said data frame;
  (c) providing fulfillment of said user-picture frames of said bitstream in accordance with said subchannel information; and
  (d) automatically excluding said data frame from said fulfillment;
when said indicator is undetected:
  providing fulfillment of said user-picture frames and said data frame in accordance with predetermined default information.

17. The method of claim 16 wherein said detecting further comprises reading an encodement associated with said image unit, said encodement designating a processing channel; and wherein said generating is in accordance with said processing channel.

18. The method of claim 17 wherein at least some of said image units have latent images recorded on photographic film and said generating further comprises chemically developing said latent images to provide visible images and scanning said visible images.

19. A method for photographic processing comprising the steps of:
receiving first and second groups of image units, each image unit of each group having a set of image frames, each set of image frames of said first group including a data frame having subchannel information and user-picture frames, each set of image frames of said second group including only user-picture frames;
detecting, independent of the data frames, the presence of said subchannel information in each said set of image frames of said first group of image units;
generating a bitstream of each said set of image frames of said first and second groups of image units to provide first and second unit bitstreams, respectively;
responsive to said detecting, automatically extracting a respective said data frame from each of said first unit bitstreams;
reading said subchannel information from said data frames following said extracting;
processing each said set of image frames of said first unit bitstreams in accordance with respective said subchannel information;
processing each said set of image frames of said second unit bitstreams in accordance with predetermined default information.

20. The method of claim 19 wherein said image units of said first and second groups are received in a random mixture.

21. The method of claim 19 wherein at least some of said image units include photographic film and said generating further comprises chemically developing said film and then digitally scanning said film.

22. The method of claim 19 further comprising, following said receiving, reading encodements on each of said image units, said encodements each identifying respective said subchannel information.

23. A photographic processing method comprising the steps of:
identifying, in a group of image units, a first subgroup having an externally detectable flag and a second subgroup lacking said flag, said image units each having a set of image frames, said image frames of said image units of said first subgroup each including a data frame, said image frames of said image units of said second subgroup each lacking a data frame;
generating a continuous digital image stream having a randomly ordered sequence of digital image sets, each said digital image set having a plurality of digital images, each of said digital images being derivative of a corresponding one of said image frames;
detecting, for each of the image units of the first subgroup, the externally detectable flag, the externally detectable flag indicating the presence of subchannel information in the corresponding image unit and being detected independent of the data frames;
extracting said data frames from said digital image stream;
decoding each said data frame to provide corresponding subchannel information;

processing said digital image sets corresponding to said first subgroup in accordance with respective said subchannel information;

processing said digital image sets corresponding to said second subgroup in accordance with predetermined default information.

24. The method of claim 23 wherein at least some of said image units have latent images recorded on photographic film and said generating further comprises chemically developing said latent images to provide visible images and scanning said visible images.

25. The method of claim 23 wherein said data frames are printable.

26. A photographic processing method comprising the steps of:
  detecting the presence of subchannel information in a film cartridge;
  removing a filmstrip from said film cartridge;
  developing said filmstrip in accordance with a film developing channel to provide a developed filmstrip;
  scanning said developed filmstrip to provide a bitstream of image frames, said image frames including a plurality of user-picture frames and a data frame;
  responsive to said detecting, extracting said data frame from said image frames of said bitstream;
  reading said data frame;
  processing said image frames in accordance with said data frame,
  wherein the presence of the subchannel information is detected independent of the data frame.

27. The method of claim 26 wherein said detecting further comprises reading an encodement on said film cartridge, said encodement identifying said film processing channel and designating the presence of said data frame.

28. The method of claim 26 wherein said data frame is the same size as the others of said image frames.

29. A system for photographically processing an image unit having a plurality of image frames, said image frames including a data frame having subchannel information and a plurality of user-picture frames, said system comprising:
  a detection station configured to hold the image unit;
  a detector mounted in operative relation to said detection station, said detector being capable of detecting the presence of the subchannel information in the image unit;
  a bitstream generator capable generating a bitstream of said image frames;
  a control unit receiving said bitstream from said bitstream generator, said control unit being operatively connected to said detector, said control unit being programmed to extract a data frame from said image frames of said bitstream responsive to said detecting,
  wherein the detector is capable of detecting the presence of the subchannel information independent of the data frame.

30. A system for photographically processing a film cartridge having a filmstrip having a plurality of image frames, said image frames including a data frame and a plurality of user-picture frames, said system comprising:
  a detection station configured to hold the film cartridge;
  a detector mounted in operative relation to said detection station, said detector being capable of detecting the presence of the subchannel information in the film cartridge;
  a film developing unit capable of receiving said filmstrip and chemically developing said filmstrip to provide a developed filmstrip;
  a scanner capable of scanning said developed filmstrip to provide a bitstream of image frames;
  a control unit receiving said bitstream from said scanner, said control unit being operatively connected to said detector, said control unit being programmed to extract the data frame from the image frames of said bitstream responsive to said detecting,
  wherein the detector is capable of detecting the presence of the subchannel information independent of the data frame.

31. The system of claim 30 wherein said control unit automatically reads said data frame and digitally processes said image frames in accordance with said data frame.

* * * * *